United States Patent
Narang et al.

[11] Patent Number: 5,830,600
[45] Date of Patent: Nov. 3, 1998

[54] NONFLAMMABLE/SELF-EXTINGUISHING ELECTROLYTES FOR BATTERIES

[75] Inventors: Subhash C. Narang, Palo Alto; Susanna C. Ventura, Los Altos; Brian J. Dougherty, Menlo Park; Ming Zhao, Menlo Park; Stuart Smedley, Menlo Park; Gary Koolpe, Mountain View, all of Calif.

[73] Assignee: SRI International, Menlo Park, Calif.

[21] Appl. No.: 653,464

[22] Filed: May 24, 1996

[51] Int. Cl.$^6$ .................................................. H01M 6/14
[52] U.S. Cl. .......................... 429/192; 429/197; 429/199; 429/203
[58] Field of Search ........................... 429/192, 194–197, 429/199, 203; 252/62.2, 500; 204/421

[56] References Cited

U.S. PATENT DOCUMENTS

| | | |
|---|---|---|
| 3,909,484 | 9/1975 | Beavon . |
| 4,071,664 | 1/1978 | Dey . |
| 4,522,901 | 6/1985 | Shacklette . |
| 4,774,011 | 9/1988 | Mori et al. .............................. 252/62.2 |
| 4,858,078 | 8/1989 | Morimoto et al. ...................... 252/500 |
| 4,894,302 | 1/1990 | Hoffman et al. . |
| 5,061,581 | 10/1991 | Narang et al. . |
| 5,114,809 | 5/1992 | Nakacho et al. . |
| 5,151,462 | 9/1992 | El-Hibri et al. ......................... 524/405 |
| 5,354,631 | 10/1994 | Chaloner-Gill et al. ................ 429/215 |
| 5,376,478 | 12/1994 | Nakacho et al. . |
| 5,455,127 | 10/1995 | Olsen et al. ............................. 429/192 |
| 5,567,546 | 10/1996 | Maly-Schreiber et al. ......... 429/192 X |
| 5,580,684 | 12/1996 | Yokoyama et al. ..................... 429/194 |
| 5,639,574 | 6/1997 | Hubbard et al. ........................ 429/192 |

FOREIGN PATENT DOCUMENTS

| | | |
|---|---|---|
| 0 141 371 | 5/1985 | European Pat. Off. . |
| 0 164 254 | 12/1985 | European Pat. Off. . |
| 58-163175 | 9/1983 | Japan . |
| 59-3871 | 1/1984 | Japan . |
| 59-3874 | 1/1984 | Japan . |
| 59-42784 | 3/1984 | Japan . |
| 59-119682 | 7/1984 | Japan . |
| 60-136180 | 7/1985 | Japan . |
| 60-216461 | 10/1985 | Japan . |

OTHER PUBLICATIONS

Larsen et al., "On the use of phosphorus as an FR–adjunct with halogenated unsaturated polyesters," *J. Fire Retardant Chem.* 6:182–192 (1979) No month.

Nametz, "Self–extinguishing polyester resins," *Ind. Eng. Chem.* 59(5):99–116 (1967).

Wiley and Sons, 2nd ed., "Fire Retardants," *Encyclopedia of Polymer Sci. and Eng.* 10:930–1022 (1988) No month.

*Primary Examiner*—Anthony Skapaps
*Attorney, Agent, or Firm*—Robert D. Fish, Esq.; Crockett & Fish

[57] ABSTRACT

Novel fire-retardant electrolyte compositions are provided. These compositions comprise a lithium salt dissolved in a fire-retardant solvent selected from the group consisting of phosphates, phospholanes, cyclophosphazenes, silanes, fluorinated carbonates, fluorinated polyethers and mixtures thereof. The electrolyte composition optionally contains a $CO_2$-generating compound. Also provided are fire-retardant batteries and fire-retardant conductive films formulated with such compositions, as well as methods of manufacturing such films.

13 Claims, 2 Drawing Sheets

NONFLAMMABLE/SELF-EXTINGUISHING ELECTROLYTES FOR BATTERIES

REFERENCE TO GOVERNMENT GRANT

This invention was made with Government support. The Government has certain rights in the invention.

TECHNICAL FIELD

The present invention relates generally to batteries. More particularly, the invention relates to a fire-retardant electrolyte composition and batteries fabricated to contain the composition. Also within the scope of the present invention are conductive films comprising the fire-retardant electrolyte composition.

BACKGROUND OF THE INVENTION

Recently, solid-state, high energy-density batteries have been developed that use metallic lithium as the anode. Lithium metal is a preferred anode material for batteries because its thermodynamic and kinetic qualities are superior to those of other materials. Lithium is a good conductor of electricity and heat and has an electrochemical equivalence of 3.86 Ah g$^{-1}$ and a standard electrode potential of −3.5 V. In addition, lithium is soft and malleable, can be readily extruded into thin sheets. However, it is well known that lithium is reactive with water and other reagents (see, e.g., Linden, D., Ed., *Handbook of Batteries and Fuel Cells*, McGraw-Hill, NY, 1984).

Typically, the liquid electrolyte solvent used in lithium batteries is a dipolar aprotic solvent. Aprotic solvents are used due to the absence of labile hydrogen atoms that would react with lithium to evolve hydrogen. Dipolar solvents, i.e., those having a strong dipole moment in the molecule, are used because they have substantial solvation energies for the electrolyte salt which results in better salt dissolution of the salt, and because they have a higher dielectric constant for the solvent, i.e., better ionic dissociation.

Solvents such as propylene carbonate ("PC"), ethylene carbonate ("EC"), diethyl carbonate ("DEC"), 1,2-dimethoxyethane, and methylformate have been used in lithium batteries either in pure form or in solvent mixtures. These solvents provide high conductivities in the presence of suitable lithium salts. However, the chemical stability and safety of these solvents has recently been questioned (see, e.g., Bowden et al. (1992) "Rechargeable Lithium Batteries, A Survey of the Published Literature, in *Proc. Fourth Int'l Rechargeable Battery Seminar*). Improved liquid organic electrolytes with higher conductivities than these solvents are needed to meet the power requirements for many consumer applications, especially at low temperatures.

In addition, commercially available lithium cells, with a pure lithium anode, are presently available only as primary cells and are not recommended for use as secondary cells. This limitation is due to the reactivity of the electrolyte system with the lithium metal.

There are at least two disadvantageous effects that arise from the reaction of lithium with the electrolyte in a lithium cell: the exothermic liberation of heat, and the formation of a passivating film on the anode surface. Liberation of heat is a problem because under some circumstances it could lead to an explosive release of energy and reactive materials, thereby creating a hazard for both the operator and the device that is being powered by the cell. Highly exothermic reactions have been known to occur when primary lithium batteries are subjected to temperatures above the recommended levels or when some rechargeable cells are subjected to unusual or severe conditions of recharging (see, e.g., Ebner et al. (1982) in *Proc. 30th Power Sources Symp.*, p 119). Primary lithium cells using, for example, a lithium thionylchloride system, have been known to undergo high exothermic reactions when subjected to temperatures above or below the recommended temperatures. In the case of secondary cells, subjecting the cells to unusual or severe recharging conditions and deposition of lithium in a highly porous film on the anode have led to similar disastrous results. Pasquariello et al. (1993) *Proc. Symp. Lithium Batteries* 93–24:106.

In addition to the intrinsic reactivity of lithium toward the electrolyte, the lithium in rechargeable cells will deposit to form a dendritic layer, which enhances the reactivity of lithium (Pasquariello et al., supra).

The formation of passive films on lithium has been shown to be one reason for the loss of capacity of lithium cells on repeated cycling (Shen et al. (1984) *Capacity Decline Studies of Rechargeable Lithium Batteries*, McGraw-Hill, N.Y.). The film can isolate the anode from the electrolyte, thereby providing a high impedance path and a degradation in cell performance. In addition, lithium metal tends to "deposit out" on the surface of the film rather than on the lithium anode; the deposited lithium is electrically isolated from the anode and is unavailable for later discharges.

The problem of lithium reactivity toward the electrolyte has been addressed in various ways. One approach is to use a carbon intercalation compound such as LiC$_6$ or LiC$_{12}$ with either a liquid or polymeric electrolyte. One disadvantage of this approach is the loss of capacity density (0.37 Ah g$^{-1}$ compared to 3.86 Ah g$^{-1}$ for lithium) and voltage (3.4 v compared to 3.5 V for lithium).

Nevertheless, commercial cells are available that have adopted this approach. Early versions of such a cell had a LiC$_{12}$ anode, a LiCoO$_2$ cathode, and used EC:DEC (in a 1:1 mixture), with lithium hexafluorophosphate (LiPF$_6$) salt as the electrolyte. This cell has demonstrated 1200 cycles to 100% depth of discharge, while retaining 77% of its capacity. Megahead (1994) *J. Power Sources* 51:79. Energy densities of about 90–110 Wh kg$^{-1}$ (210–260 Wh dm$^{-3}$), depending on the cell configuration, have been achieved by this cell. Megahead, supra. More recently, versions of this cell manufactured with LiC$_6$ instead of LiC$_{12}$ as the anode have achieved comparable cycling performance with improved energy density. Although the performance of this cell is adequate, the improvement in energy density that could be obtained by using Li as the anode is significant provided the rechargeability of the Li is improved.

Replacement of lithium with LiC$_6$ increases the onset temperature of exothermic behavior to 120° C. from 100° C. for a Li|MnO$_2$ cell after 25 cycles as measured by accelerated rate calorimetry. Von Slacken et al. (1994) *Proc. Seventh Int'l Meeting on Lithium Batteries*, p. 12. In addition, the heat capacity of the reaction was lower (1.7–2.0 cal °K$^{-1}$ versus 2.8 cal °K$^{-1}$ for Li|MnO$_2$). However, the lithium anode becomes more strongly exothermic as it is cycled (Von Slacken et al., supra), presumably because of the formation of a more porous electrode structure and, hence, greater surface area.

A second approach to reduce the problem of lithium reactivity toward the electrolyte is to replace the electrolyte with a polymeric material. This approach would reduce the rate of reaction by imposing a transport limitation on the reaction. However, the conductivity of polymer electrolytes is at least an order of magnitude lower than that of liquid electrolytes, resulting in batteries of lower specific energy and power. Furthermore, this approach requires the use of alternate battery fabrication techniques.

Accordingly, there remains a need to provide safe primary and secondary lithium batteries. Such batteries require an electrolyte that is chemically stable with respect to lithium, is substantially nonflammable, and is compatible with existing electrode and battery fabrication technology. The present invention provides such batteries. The novel batteries do not exhibit the drawbacks exhibited by prior batteries such as combustion under conditions of overcharging, accidental rupture, accidental short-circuiting, and the like.

SUMMARY OF THE INVENTION

Accordingly, it is a primary object of the invention to address the aforementioned need in the art by providing a lithium battery containing a fire-retardant electrolyte composition.

It is another object of the invention to provide such a battery comprising an anode, a cathode and a fire-retardant electrolyte composition.

It is still another object of the invention to provide such a battery in which the electrolyte composition comprises a lithium salt dissolved in a solvent selected from the group consisting of a phosphate, a phospholane, a cyclophosphazene, a silane, a fluorinated carbonate, a fluorinated polyether, and mixtures thereof.

It is still another object of the invention to provide a battery comprising a fire-retardant electrolyte composition as above, wherein the composition further includes a $CO_2$-generating compound.

It is yet another object of the invention to provide a fire-retardant electrolyte composition comprising a lithium salt dissolved in a solvent selected from the group consisting of a phosphate, a phospholane, a cyclophosphazene, a silane, a fluorinated carbonate, a fluorinated polyether, or mixtures thereof, as described above, and wherein the fire-retardant electrolyte composition optionally includes a film-forming polymeric material.

It is a further object of the invention to provide a fire-retardant electrolyte composition as described above and, optionally, containing a $CO_2$-generating compound.

It is still a further object of the invention to provide a fire-retardant conductive film generally formed from a combination of a lithium salt or a single-ion conducting polymer electrolyte dissolved in a fire-retardant electrolyte solvent as described above, an amount of a film-forming polymeric material such as poly(vinylidene fluoride) effective to enhance the mechanical strength of the resulting electrolyte composition, and, optionally, a $CO_2$-generating compound. In this manner, thin but nevertheless highly conducting films may be formulated having fire-retardant physical properties.

Additional objects, advantages and novel features of the invention will be set forth in part in the description that follows, and in part will become apparent to those skilled in the art upon examination of the following, or may be learned by practice of the invention.

In a primary aspect of the invention, batteries are provided that comprise an anode, a cathode and a fire-retardant electrolyte composition including a lithium salt dissolved in a solvent, wherein the solvent is a phosphate having the structure as shown in Formula I wherein $R^1$, $R^2$ and $R^3$ are independently selected from the group consisting of (a) $C_1$–$C_6$ alkyl terminally substituted with 0 to 3 halogen atoms and containing 0 to 3 ether linkages, (b) $Si(R^4)_3$ and (c) $B(OR^4)_2$, wherein the $R^4$s are independently $C_1$–$C_6$ alkyl containing 0 to 3 ether linkages or $C_1$–$C_3$ alkoxy, and optionally wherein two or more compounds of structure (I) are linked together by an ether linkage, a phospholane having the structure as shown in Formula (II), wherein $R^5$ is selected from the group consisting of oxy or a pair of electrons and, when $R^5$ is a pair of electrons, $R^6$ is $C_1$–$C_6$ alkyl terminally substituted with 0 to 3 halogen atoms and containing 0 to 3 ether linkages, a cyclophosphazene having the structure as shown in Formula (III), wherein n is an integer from 3 to 6 and $R^7$ and $R^8$ are independently selected from the group consisting of hydrogen, halogen and —$OR^9$ wherein $R^9$ is $C_1$–$C_6$ alkyl terminally substituted with 0 to 3 halogen atoms and containing 0 to 3 ether linkages, with the proviso that when one of $R^7$ or $R^8$ is —$OR^9$, the other is halogen, a silane having the structure as shown in Formula (IV), wherein $R^{10}$, $R^{11}$, $R^{12}$ and $R^{13}$ are independently selected from the group consisting of (a) $C_1$–$C_6$ alkyl terminally substituted with 0 to 3 halogen atoms and containing 0 to 3 ether linkages and (b) —$OR^{14}$ wherein $R^{14}$ is $C_1$–$C_6$ alkyl terminally substituted with 0 to 3 halogen atoms and containing 0 to 3 ether linkages, and optionally wherein two or more compounds of structure (IV) are linked together by a siloxane linkage, a fluorinated carbonate having the structure as shown in Formula (V), wherein $R^{15}$ and $R^{16}$ are independently selected from the group consisting of (a) perfluorinated or partially fluorinated $C_1$–$C_{10}$ alkyl containing 0 to 3 ether linkages and (b) —$OR^{17}$ wherein $R^{17}$ is perfluorinated or partially fluorinated $C_1$–$C_{10}$ alkyl containing 0 to 3 ether linkages or wherein $R^{15}$ and $R^{16}$ are linked together to form a perfluorinated or partially fluorinated $C_1$–$C_{10}$ alkyl bridge, a fluorinated polyether having the structure shown in Formula (VI)

wherein $R^{18}$ and $R^{19}$ are independently perfluorinated or partially fluorinated $C_1$–$C_{10}$ alkyl, $R^{20}$ and $R^{21}$ are independently selected from the group consisting of —F and perfluorinated or partially fluorinated $C_1$–$C_{10}$ alkyl, and x and y are independently selected such that the polymer has a number average molecular weight in the range of about 400 to about 10,000, or mixtures of such phosphates, phospholanes, cyclophosphazenes, silanes, fluorinated carbonates, and fluorinated polyethers, and wherein the fire-retardant electrolyte composition optionally includes a film-forming polymeric material.

In further aspects of the invention, fire-retardant electrolyte compositions and fire-retardant conductive films comprising the solvents as described above are provided. The fire-retardant electrolyte compositions and conductive films disclosed and claimed herein may be used in batteries, for example, a solid state $Li_xC_6$/electrolyte/$LiCoO_2$, Li/electrolyte/$TiS_2$, or Li/electrolyte/$V_6O_{13}$ battery, or in electrochemical devices such as fuel cells, supercapacitors, electrochromic devices and sensors, or the like.

DETAILED DESCRIPTION OF THE INVENTION

The practice of the present invention will employ, unless otherwise indicated, conventional techniques of synthetic chemistry, electrochemistry, and polymer chemistry that are within the skill of the art. Such techniques are explained fully in the literature. See, e.g., Kirk-Othmer's *Encyclopedia of Chemical Technology*, in House's *Modern Synthetic Reactions*, in C. S. Marvel and G. S. Hiers' text *ORGANIC SYNTHESIS*, Collective Volume 1, or the like.

All patents, patent applications and publications cited herein, whether supra or infra, are hereby incorporated by reference in their entirety.

Definitions

Before describing the present invention in detail, it is to be understood that this invention is not limited to particular salts, methods of synthesis, solvents, or the like, as such may vary. It is also to be understood that the terminology used herein is for the purpose of describing particular embodiments only, and is not intended to be limiting.

It must be noted that, as used in this specification and the appended claims, the singular forms "a," "an" and "the" include plural referents unless the content clearly dictates otherwise. Thus, for example, reference to "a fire-retardant electrolyte composition" includes mixtures of such composition, reference to "a solvent" includes more than one such solvent, reference to "a $CO_2$ generator" includes mixtures of $CO_2$ generators, and the like.

In this specification and in the claims which follow, reference will be made to a number of terms which shall be defined to have the following meanings:

The terms "fire-retardant" and "nonflammable" are used interchangeably herein to indicate a reduction or elimination of the tendency of a combustible material to burn, i.e., a "fire-retardant" material is one having a lower ignition susceptibility or, once ignited, lower flammability. Thus, a fire-retardant electrolyte composition is one in which the basic flammability has been reduced as measured by accelerated rate calorimetry (see, e.g., Von Slacken et al., supra), or by one of the art-accepted standard flame or heat impingement tests, or other standard test of reduced flammability, for example, ASTM D2863 (limiting oxygen index) (see, e.g., *Tests for Flammability of Plastic Materials for Parts in Devices and Appliances*, Underwriters Laboratories, Northbrook, Ill., 1991; *National Fire Codes*, National Fire Protection Assoc., Quincy, Mass., 1992; *Standard Test Method for Heat and Visible Smoke Release Rates for Materials and Products*, American Society for Testing and Material, Philadelphia, Pa., 1991; see, also, "Fire Retardants" in *Encyclopedia of Polymer Science and Engineering*, Vol. 10, page 930–1022, 2nd ed., John Wiley and Sons, NY, 1988).

The terms "$CO_2$-generating compound" and "$CO_2$ generator" are used interchangeably to refer to a chemical source of carbon dioxide. A $CO_2$ generator typically yields $CO_2$ upon decomposition. $CO_2$ generators that are preferred for use in the claimed electrolyte compositions are those that do not produce decomposition byproducts that are incompatible, either chemically or electrochemically with the electrolyte or other battery materials. Test cells containing such $CO_2$ generators in addition to flame-retardant electrolytes have improved discharge-recharge cycling properties in a manner consistent with the report by Aurbach et al. (1994) *J. Electrochem. Soc.* 141:603.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms. The term "lower alkyl" intends an alkyl group of one to six carbon atoms.

The term "alkenyl" refers to a branched or unbranched hydrocarbon chain containing from 2 to 24 carbon atoms and at least one double bond. "Lower alkenyl" refers to an alkenyl group of 2 to 6, more preferably 2 to 5, carbon atoms. The term "fluorinated lower alkenyl" intends an alkenyl group of one to six carbon atoms in which at least one hydrogen atom, and optionally all hydrogen atoms, are replaced with fluorine atoms.

The term "alkoxy" as used herein intends an alkyl group bound through a single, terminal ether linkage; that is, an "alkoxy" group may be defined as —OR wherein R is alkyl as defined above. A "lower alkoxy" group intends an alkoxy group containing one to six, more preferably one to four, carbon atoms.

The term "aryl" as used herein refers to a monocyclic aromatic species of 5 to 7 carbon atoms, and is typically phenyl. Optionally, these groups are substituted with one to four, more preferably one to two, lower alkyl, lower alkoxy, hydroxy, and/or nitro substituents.

The term "aralkylene" is used to refer to moieties containing both alkylene and monocyclic aryl species, typically containing less than about 12 carbon atoms in the alkylene portion, and wherein the aryl substituent is bonded to the structure of interest through an alkylene linking group. Exemplary aralkylene groups have the structure —$(CH_2)_j$—Ar wherein j is an integer in the range of 1 to 6.

"Halo" or "halogen" refers to fluoro, chloro, bromo or iodo, and usually relates to halo substitution for a hydrogen atom in an organic compound. "Haloalkyl" refers to an alkyl moiety in which one or more of the hydrogen atoms is substituted by a halo atom. Of the halos, fluoro is generally preferred. The term "lower haloalkyl" intends an alkyl group of one to six carbon atoms in which at least one hydrogen atom, and optionally, all hydrogen atoms, are replaced with halogen atoms. The term "perhalogenated" refers to a compound in which all of the hydrogen atoms have been replaced by fluorine atoms, while the phrase "partially halogenated" refers to a compound in which less than all of the hydrogen atoms have been replaced by fluorine. Thus, a perfluorinated alkyl is a branched or unbranched saturated hydrocarbon group as defined above in which all of the hydrogen atoms have been replaced by fluorine atoms.

"Optional" or "optionally" means that the subsequently described circumstance may or may not occur, and that the description includes instances in which said circumstance occurs and instances in which it does not. For example, the phrase "optionally including a film-forming polymeric material" means that a film-forming polymeric material may or may not be present and that the description includes both the instance when the film-forming polymeric is present and the instance when the film-forming polymeric material is not present.

In one embodiment of the invention, there is provided a battery comprising an anode, a cathode and a fire-retardant electrolyte composition comprising a lithium salt dissolved in a solvent that includes low-flammability, self-extinguishing, i.e., fire-retardant, solvents that are chemically stable to lithium. Such fire-retardant solvents include phosphates, phospholanes, cyclophosphazenes, silanes and mixtures of such solvents.

Many fire-retardant solvents that are useful in the invention disclosed and claimed herein are commercially available or can be readily synthesized using conventional techniques well known to those skilled in the art of synthetic organic chemistry or which may be found in relevant texts.

Fire-retardant phosphate solvents that are useful in the invention include those having the structure as shown in Formula (I)

wherein $R^1$, $R^2$ and $R^3$ are as defined above and optionally wherein two or more compounds of structure (I) are linked together by an ether linkage. Commercially available phosphate solvents include, for example, trimethyl-phosphate (Aldrich) and triethylphosphate (Aldrich). Alternatively, triethylphosphate, a well-known flame retardant and plasticizer (see, e.g., U.S. Pat. No. 3,909,484 to Beavon; Nametz (1967) Ind. Eng. Chem. 59:99; and Larsen et al. (1979) J. Fire Retardant Chem. 6:182) can be readily manufactured from diethyl ether and phosphorus pentoxide via a meta-phosphate intermediate as described in U.S. Pat. Nos. 2,430,569 and 2,407,279 to Hull et al. Other such phosphates can be synthesized using conventional synthetic techniques. Thus, tris-(methoxyethyl)phosphate, tris-(methoxyethoxyethyl)phosphate and tris-(1,1',1"-trifluoroethyl)phosphate can be prepared by reaction of phosphorylchloride with 2-methoxyethanol, 2-(2-methoxy) ethoxyethanol and 1,1',1"-trifluoroethanol, respectively, in the presence of pyridine.

Fire-retardant phospholane solvents that are useful in the invention include those having the structure as shown in Formula (II), wherein $R^5$ and $R^6$ are as defined above. Commercially available phospholanes include Antiblaze® 19 and Antiblaze® 1045 (Albright and Wilson). Such phospholanes can be synthesized by one of skill in the art using conventional synthetic techniques (see, e.g., U.S. Pat. Nos. 3,789,091 and 3,849,368 to Anderson et al.). For example, the phospholanes and can be synthesized from the correspondent 2-chloro-1,3,2-dioxaphospholane-2-oxide by reaction with ethanol, 2-methoxyethanol, 2,2,2-trifluoroethanol, 2-acetylethanol and 2-methoxyethoxyethanol, respectively. Alternative methods of preparing the phospholane have been reported by Kluger et al. (1969) J. Am. Chem. Soc. 91:6066 and Taira et al. (1984) J. Org. Chem. 49:4531. The phospholane can be prepared by reaction of 2-chloro-1,3,2-dioxaphospholane with ethanol.

Fire-retardant cyclophosphazene solvents that are useful in the invention include those having the structure as shown in Formula (III), wherein $R^7$, $R^8$ and n are defined as above. Such cyclophosphazenes can be prepared, for example, by reacting fluoro-phosphazenes with alkoxy alcohols. Thus, the cyclotriphosphazenes and can be prepared by reacting hexafluorotricyclophosphazene with 2-methoxyethanol under conditions adequate to achieve tri- and mono-substitution, respectively.

Fire-retardant silane solvents that are useful in the invention include those having the structure as shown in Formula (IV)

wherein $R^{10}$, $R^{11}$, $R^{12}$ and $R^{13}$ are as defined above.

Among the preferred silane solvents are such commercially available (e.g., Aldrich) silane compounds as tetramethyl orthosilicate, tetraethyl orthosilicate, tetrabutyl orthosilicate, and the like.

In addition, siloxane-based and phosphazene-based solvents for electrolyte compositions can by synthesized by functionalization of hydromethylsiloxanes and cyclotriphosphazene with ether derivatives. Hydrosiloxanes can be functionalized by reaction with alcohols in the presence of a base, or by hydrosilylation with allyl ethers.

Fire-retardant fluorinated carbonate solvents that are useful in the invention include those having the structure as shown in Formula (V), wherein $R^{15}$ and $R^{16}$ are as defined above. Such fluorinated carbonates can be synthesized by one of skill in the art using conventional synthetic techniques as described in, for example, U.S. Pat. No. 3,455,954 to Prager, European Patent Publication No. 0557167, Johnson et al. (1973/74) *J. Fluorine Chem.* 3:1–6, Moore et al. 975) *J. Fluorine Chem.* 5:77–81, Walker et al. (1975) *J. Fluorine Chem.* 5:135–139, and Hudlicky (1982) *J. Fluorine Chem.* 20:649–658, the disclosures of which are incorporated herein by reference.

Fire-retardant fluorinated polyether solvents that are useful in the invention include those having the structure shown in Formula (VI)

wherein $R^{18}$, $R^{19}$, $R^{20}$ and $R^{21}$ are as defined above. Fluorinated polyethers having Formula (VI) are commercially available as, for example, FOMBLIN® (Aldrich) or Galdens (PCR Inc., Gaineville, Fla.). Alternatively, such fluorinated polyethers can be prepared using the method described by Sianesi et al. (1994) in *Organofluorine Chemistry: Principle and Applications*, Banks et al., eds., Plenum Press, NY, 431–467 (and references cited therein). One of skill in the art can also prepare such fluorinated polyethers using well-known methods of fluorination of commercially available polyethers such as described in, for example, Persico et al. (1985) *J. Am. Chem. Soc.* 107:1197–1201, Gerhardt et al. (1981) *J. Chem. Soc.*, Perkin Trans. 1:1321, Gerhardt et al. (1979) *J. Polym. Sci., Polym. Chem. Ed.* 18:157, Gerhardt et al. (1978) *J. Org. Chem.* 43:4505, and Gerhardt et al. (1977) *J. Chem. Soc., Chem. Commun.* 8:259.

Optionally, at least one of $R^1$, $R^2$ and $R^3$, or $R^6$, or $R^9$, or at least one of $R^{10}$, $R^{11}$, $R^{12}$ and $R^{13}$ is modified to contain on the terminal carbon a substituent group having the structure —$R^{22}$—O—C(O)—O—$R^{23}$, wherein $R^{22}$ and $R^{23}$ are independently $C_1$–$C_6$ alkyl or wherein $R^{22}$ and $R^{23}$ are linked together to form a $C_1$–$C_6$ alkylene bridge, thereby forming a homo- (e.g., phosphate-phosphate dimers) or heterodimeric (e.g., phosphate-silane dimers) solvent.

In one embodiment of the invention, a fire-retardant electrolyte composition is prepared by dissolving a lithium salt in a fire-retardant solvent. Preferred lithium salts include compounds of the formula Li—A, wherein A is an anion which may be Cl, $CF_3SO_3$, $ClO_4$, $BF_4$, Br, I, SCN, $AsF_6$, $N(CF_3SO_2)_2$, $PF_6$, $SbF_6$, $O(CO)R'$, wherein $R'$ is H, alkyl, aryl, alkenyl, halo, haloalkyl, or the like. Preferred salts include, for example, $LiPF_6$, $LiAsF_6$, $LiN(SO_2CF_3)_2$, and mixtures thereof. Solutions of lithium salts in fire-retardant solvents are prepared to achieve approximately 0.2M to 2.0M lithium, preferably 0.5M to 1.5M lithium.

The term "lithium salt" is also intended to include single-ion conducting polymer electrolytes as described in commonly assigned U.S. Pat. No. 5,061,581 to Narang et al., as well as in U.S. patent application Ser. No. 08/372,216, now U.S. Pat. No. 5,548,055, entitled "Single-Ion Conducting Solid Polymer Electrolytes," inventors Narang et al., filed on Jan. 13, 1995. The disclosures of both of the aforementioned documents are incorporated herein by reference. Thus, a flame-retardant electrolyte composition may be prepared by dissolving a single-ion conducting polymer electrolyte in one of the solvents described above to achieve approximately 0.2M to 2.0M lithium, preferably 0.5M to 1.5M lithium.

Single-ion conducting polymer electrolytes that are specifically contemplated for use herein include those having the structure as shown in Formula (VII)

wherein:
$R^{24}$ and $R^{25}$ are individually selected from the group consisting of moieties having the structure in which $R^{26}$ is —OM, —N(M)$SO_2CF_3$, —N(M)C(O)$CF_3$ or —C(M)($SO_2CF_3$)$_2$ and M is an alkali metal, preferably lithium, or wherein one of $R^{24}$ and $R^{25}$ has the structure and the other is selected from the group consisting of hydrogen, lower alkyl, lower halo alkyl, lower alkenyl, fluorinated lower alkenyl, aryl and aralkylene;

x1 and z1 may be the same or different and are integers in the range of 1 to 100 inclusive;

y1 is an integer in the range of 0 to 100 inclusive; and n is an integer indicating the number of mer units in the polymer.

Additional single-ion conducting polymer electrolytes contemplated for use in the invention disclosed and claimed herein include co-polymers which contain first mer units having the structure as shown in and second mer units having the structure as shown in Formula (IX)

wherein:

$R^{27}$ and $R^{29}$ are independently selected from the group consisting of hydrogen, lower alkyl, lower alkoxy, —COOR$^{31}$ and —(CH$_2$)$_{n1}$—O—R$^{31}$ in which R$^{31}$ is lower alkyl or fluorinated lower alkyl and n1 is an integer in the range of 1 to 6 inclusive;

$R^{28}$ is —(CH$_2$)$_{x4}$(OCH$_2$CH$_2$)$_{y4}$(OCF$_2$CF$_2$)$_{z4}$SO$_2$R$^{26}$ in which R$^{26}$ is as defined above;

$R^{30}$ is —(CH$_2$)$_{x5}$(OCH$_2$CH$_2$)$_{y5}$OCH$_3$ or —COOR$^{32}$ in which R$^{32}$ is lower alkyl or fluorinated lower alkyl; and x2, x3, x4, x5, y2, y3, y4, y5, z2, z3 and z4 may be the same or different and are integers in the range of 1 to 100 inclusive.

Accordingly, the fire-retardant electrolyte composition may be formulated with a lithium salt of the formula Li—A or a single-ion conducting polymer electrolyte as described above.

In addition, a high dielectric constant solvent such as ethylene carbonate, propylene carbonate, dimethyl carbonate, diethoxyethane, diethyl carbonate, dimethoxyethane, dipropyl carbonate, methoxyethoxy ethyl ether, or mixtures thereof, may be added to the fire-retardant electrolyte composition. Such formulations have been shown to have conductivities at ambient temperature higher than 1×10$^{-3}$ S/cm.

The fire-retardant electrolyte compositions may also be formulated with a CO$_2$-generating compound. Incorporation of a CO$_2$-generating compound provides enhanced battery cycling properties. For example, a battery containing a CO$_2$-generating compound is capable of being charged, discharged and recharged over a greater number of such cycles. Such CO$_2$-generating additives may be selected so that any decomposition by-products are compatible both chemically and electrochemically with the electrolyte and other battery materials. Examples of such compounds include dicarbonates, esters, peresters, dioxalates, acyl peroxides, peroxodicarbonates, Diels-Alder adducts of carbon dioxide, and mixtures thereof. One preferred CO$_2$ generator is di-tert-butyl dicarbonate ("DTBD").

Mechanically strong electrolyte films having conductivities higher than 10$^{-3}$ S cm$^{-1}$ may be formed from a combination of: a solvent electrolyte as disclosed and claimed herein or mixtures of such solvent electrolytes; a film-forming polymeric material such as poly(vinylidene fluoride) ("PVdF"), polyacrylonitrile, copolymers of vinylidenefluoride and hexafluoropropylene, or the like, preferably PVdF; a lithium salt of the formula Li—A, wherein A is as defined above, or a single-ion conducting polymer electrolyte as disclosed in Ser. No. 08/372,216, incorporated by reference above; optionally, a high dielectric constant solvent such as propylene carbonate ("PC"), ethylene carbonate ("EC"), dimethoxyethane ("DME"), and methoxyethoxy ethyl ether ("MEE"); and, optionally, a CO$_2$-generating compound. It may be necessary to add a glyme (e.g., dimethoxyethane (C$_4$H$_{10}$O$_2$), diglyme (C$_6$H$_{14}$O$_3$), triglyme (C$_8$H$_{18}$O$_4$), tetraglyme (C$_{10}$H$_{22}$O$_5$) or so on) to form a homogeneous blend of the polymer electrolyte with PVdF; such compounds will typically serve not only as solvents but as additional plasticizing agents as well.

It will be appreciated that conductive compositions formulated with the present electrolyte materials are also useful in the fabrication of fuel cells, sensors, supercapacitors, electrochromic devices, and the like, using manufacturing techniques well known to those skilled in the art, or readily available in the relevant literature.

Manufacturing Methods

A preferred method of manufacturing conductive compositions containing the novel electrolytes is a hot-press technique for forming films. Such a method typically involves: (a) forming a gel electrolyte composition by combining (i) a lithium salt or single-ion conducting polymer electrolyte (i.e., a polysiloxane of Formula (I) or a copolymer containing mer units (II) and (III)), with (ii) an effective amount of fire-retardant solvent and (iii) an amount of PVdF or an alternative material effective to enhance the mechanical strength of the composition; (b) heating the resulting combination at a temperature and for a time effective to form a fluid solution; (c) pressing the fluid solution; (d) cooling the solution; and (e) releasing the film so provided. Alternative methods of manufacturing such conductive compositions will be readily apparent to those skilled in the art, or may be deduced from the relevant literature.

Industrial Applicability

Fire-retardant electrolyte compositions are useful in a variety of contexts. An important utility is in the fabrication of batteries. Batteries formulated with the novel electrolyte compositions comprise a positive electrode, or anode, a negative electrode, or cathode, and electrolyte composition. Anodes and cathodes may be fabricated from materials that are commonly used in primary and/or secondary batteries. The anode is typically lithium metal. Alternatively, a carbon-based material such as petroleum coke or graphite, intercalating metal oxides such as tungsten or iron oxides, or other intercalating materials such as TiS$_2$, may be used as the anode. The cathode is generally of a lithium-containing material such as LiCoO$_2$, LiMn$_2$O$_4$ or LiNio$_2$; however, alternative materials could be used as well, e.g., V$_6$O$_{13}$, MnO$_2$, FeS$_2$, or the like.

It will be appreciated that conductive compositions formulated with the novel electrolyte compositions of the invention are also useful in the fabrication of fuel cells, sensors, supercapacitors, electrochromic devices, and the like, using manufacturing techniques well known to those skilled in the art, or readily available in the relevant literature.

The following examples are intended to provide those of ordinary skill in the art with a complete disclosure and description of how to make and use the novel electrolyte compositions of the invention, and are not intended to limit the scope of what the inventors regard as their invention in any way. Efforts have been made to ensure accuracy with respect to numbers used (e.g., amounts, temperatures, etc), but some experimental error and deviation should, of course, be allowed for. Unless indicated otherwise, parts are parts by weight, temperatures are in degrees centigrade, and pressure is at or near atmospheric. All chemicals, reagents, and the like, are commercially available or are otherwise readily synthesized using conventional techniques well known in the art.

Experimental

Equipment and Measurement Technique

A. Physicochemical Characterization of Solvents and Electrolytes

Dielectric Constant: The dielectric constant, $\in$, of fire-retardant solvents was determined in an electrochemical cell containing two platinum electrodes. The electrodes had a diameter of 0.8 cm, area of 0.50 cm$^2$, and an interelectrode spacing of 0.1 cm, giving a sample volume of 0.05 cm$^3$. A Hewlett-Packard HP 4192A LF impedance analyzer was used to measure the capacitance C, of the cell when filled with the candidate. $\in$ was calculated using $\in=C\backslash b_\in$, wherein $b_\in$ is the cell constant. Two samples with known dielectric constants, water and trichloromethane, were used to calibrate the cell and calculate $b_\in$.

Viscosity: A Cannon-Ubbelohde viscometer was used to measure the viscosities of fire-retardant solvents. The kinematic viscosity, v, was calculated using $v=b_v\tau$, wherein $b_v$ is the calibration constant of the viscometer and $\tau$ is time measured for a fixed volume of solvent to flow through the capillary of the viscometer. Water and 1-propanol were used as standards to determine $b_v$. The dynamic viscosity was calculated via $\eta=v\rho$ wherein $\rho$ is the density of the sample.

Electrical Conductivity: Conductivity cells were fabricated from high-density polyethylene; two nickel plates were used as electrodes. The exposed area of the Ni plates was 0.2 cm$^2$; the interelectrode spacing was 1 cm. The conductivities of solutions prepared from fire-retardant solvents and lithium hexafluorophosphate (LiPF$_6$) were measured using the AC impedance method. Typically, saturated solutions were prepared; generally, these were about 0.5M. The conductivity, $\kappa$, is given by $\kappa=b_{78}/R_\infty$ wherein $b_\kappa$ is the cell constant and $R_\infty$ is the real component of the AC impedance at high frequency (10 KHz). Cell constants were obtained by measuring the conductivities of aqueous KCl standard solutions of two concentrations. In cases wherein $\kappa>5$ mS cm$^{-1}$, the conductivities of solutions prepared using other salts, e.g., lithium bis(trifluoromethanesulfonate)imide (LiN(CF$_3$SO$_3$)$_2$), and the concentration dependence of the conductivities of LiPF$_6$ solutions were also measured.

Conductivities were measured in 1 mol dm$^{-3}$ LiPF$_6$ solutions, or in cases wherein LiPF$_6$ was poorly soluble in the solvent, saturated LiPF$_6$ solutions were used.

B. Electrochemical Characterization

Cyclic Voltammetry: Cyclic voltammograms of the different electrodes were obtained in a three-electrode cell under an argon atmosphere. The electrodes were glassy carbon as working electrode, platinum as counter electrode, and lithium as reference electrode. In some cases, to test the stability of the solvent against Li, Li was used as both working and counter electrodes.

Cell Testing: Fire-retardant electrolytes that had acceptable solvent properties determined as described above were tested in a variety of electrochemical cells;

i. Li|Ni cells. DC charge/discharge cycling experiments were conducted in a high-density polyethylene cell with a nickel working, lithium foil counter, and lithium reference electrodes to determine the stability of lithium metal in the solvent. Lithium was plated onto the nickel electrode at a constant current density of 1 mA cm$^{-2}$ for one hour; the total charge passed was 3.6 C cm$^{-2}$. The cell was then cycled by alternately stripping (discharge) and plating (charge) 1.2 C cm$^{-2}$ of Li from the nickel electrode at a constant current density of 1 mA cm$^{-2}$ for twenty minutes or, during the stripping process, until the nickel electrode potential reached +1.0 V versus Li|Li$^+$. The cell was deemed to have failed when the charge passed during the stripping step, $Q_{strip}$, was less than 50% of the charge passed during the plating step, $Q_{plate}$. The parameters of interest are the number of cycles before failure, $N_{cy}$, and the cycling efficiency, $Q_{eff}$, which is calculated as $Q_{eff}=Q_{strip}/Q_{plate}$. $N_{cy}$ and $Q_{eff}$ provide a measure of the reactivity and an indication of the cyclability of the solvent with Li.

ii. Li|Li cells. Solvents were tested in cells containing lithium anodes and cathodes and a lithium reference electrode. A current density of 3 mA cm$^{-2}$ and half-cycle times of 30 minutes were used to cycle the cell, although the effect of current density and charge/discharge time (i.e., depth of discharge) were also parameters noted. An overpotential of 2.0 V at either Li electrode was considered as an indication of failure. The objective of these tests was to measure the lithium Figure of Merit ("FOM") in the solvent of interest and to judge therefrom the suitability of the solvent for use in secondary cells.

iii. Li Primary Cells. The high density polyethylene cells described above were used to test solvent electrolytes against cathodes used in commercial primary cells. The cathode materials used were iron disulfide (FeS$_2$) and manganese-dioxide (MnO$_2$). Cathodes were prepared by mixing 85 wt. % FeS$_2$ or MnO$_2$ and 5 wt. % carbon black with 10 wt. % PVdF binder then pressing the mixture onto nickel foil substrates (0.5 cm$^2$ to 2 cm$^2$). The cathodes were dried at 90° C. overnight. Cells were assembled from these cathodes, lithium foil anodes and a lithium reference electrode inside an argon-filled dry-box. The assembled cells were removed from the dry-box and discharged at various current densities using a Maccor battery tester. The objective of these tests was to compare the electrochemical performance of the solvents with that of commercial primary cells. An Energizer® lithium cell (Li|FeS$_2$) (Eveready Battery Co.) was used as a baseline.

iv. Lithium Secondary Cells. The purpose of these tests was to determine whether the nonflammable electrolytes could be used in lithium secondary, i.e., rechargeable, batteries. The experiments were performed using a cell with a lithium anode or a carbon anode, a LiCoO$_2$ or LiMn$_2$O$_4$ intercalation cathode, and a lithium reference electrode. CO$_2$ or a CO$_2$ generator was used to improve cyclability of the lithium. The cathodes and cells were prepared as described above. Cells were cycled galvanostatically at various current densities between cell voltage limits 4.2 V (charge) and 3.5 V (discharge).

C. Flammability Tests

Two tests were used to determine the flammability of fire-retardant solvents. The first was differential scanning calorimetry ("DSC") in which samples of the solvents were heated with and without lithium to expose potential thermal hazards associated with the solvent either by itself or in contact with materials likely to be present in a cell. The second technique was accelerating rate calorimetry ("ARC"). The ARC is an adiabatic calorimeter in which heat evolved from the test sample is used to raise the sample temperature. ARC is conducted by placing a sample in a sample bomb inside an insulating jacket. In an ARC analysis, the sample is heated to a preselected initial temperature and held a period of time to achieve thermal equilibrium. A search is then conducted to measure the rate of heat gain ("self-heating") of the sample. If the rate of self-heating is less than a preset rate after the programmed time interval (typically 0.02° C. min⁻¹), the sample temperature is stepped to a new value, and the heat-wait-search sequence is repeated. Once a self-heating rate greater than the present value is measured, the heat-wait-search sequence is abandoned; the only heating supplied to the calorimeter thereafter is that required to maintain the adiabatic condition between the sample and the jacket. Heat generated from the reaction inside the sample increases its temperature and pressure, thereby increasing the rate of the reaction. See, e.g., Townsend et al. (1980) *Thermochim. Acta* 37:1. This technique provide information for thermal hazard evaluation, material handling procedures, and can provide additional information on the energies of activation, storageability, and other fundamental thermokinetic parameters that are not available using other techniques.

EXAMPLE 1

Synthesis of

Ethanol (2.3 gm) and pyridine (3.95 gm) were dissolved in 5 ml benzene and the solution was cooled to 0° C. on an ice bath. 2-Chloro-1,3,2-dioxaphospholane-2-oxide (5.985 gm) (Aldrich) in benzene (2 ml) was then added drop-wise to the solution to form a reaction mixture. The reaction mixture was then stirred at ambient temperature for 1 hour and heated at reflux for another hour.

The product-was distilled and redistilled. The properties of the product corresponded to those previously reported (Kluger et al., supra; Taira et al., supra). The final distillate was used to prepare fire-retardant electrolyte compositions or fire-retardant gel polymer electrolyte films employed in batteries.

EXAMPLE 2

Synthesis of Tris-(methoxyethoxyethyl)phosphate

A solution containing 7.44 gm 2-methoxyethoxyethanol (Aldrich) and 7.7 gm of 4-di-methylaminopyridine ("DMAP") (Sigma) was prepared in 25 ml benzene and cooled to 0° C. on an ice bath under an Ar atmosphere. Phosphorylchloride (3.06 gm) (Aldrich) in 5 ml benzene was added drop-wise to the solution which was then stirred at ambient temperature for 3 hrs and refluxed overnight. The reaction mixture was then filtered, and chloroform (100 ml) was added and the mixture was washed with brine (50 ml). The washed, organic phase was dried over anhydrous $Na_2SO_4$ and rotary evaporated to dryness, yielding 7.68 gm of product (a 96.6% yield). ¹H-NMR of the residue indicated that the reaction had gone to completion. TLC chromatography in ethyl acetate showed two spots, one of which corresponded to DMAP and the other corresponded to the product.

The residue was chromatographed on silica gel using ethyl acetate as the eluant. The product was recovered in the second, third, and fourth 40-ml fractions which were pooled. The pooled eluate was dried under a vacuum to yield 4.5 gm (56% yield) of tris-(methoxyethoxyethyl)phosphate which was used as is to prepare fire-retardant electrolyte compositions or fire-retardant gel polymer electrolyte films employed in batteries.

EXAMPLE 3

Synthesis of Tris-(2-methoxyethoxy) trifluorophosphazene

2-Methoxyethanol (2.28 gm) (Aldrich) was added drop-wise to 20 ml of a suspension of 1.32 gm NaH (from a 60% w/v suspension in mineral oil) (Aldrich) in tetrahydrofuran ("THF"), thereby forming the sodium salt. The resultant solution was stirred at ambient temperature for 1 hour and then added drop-wise to a solution of hexafluorophosphazene (2.49 gm) (Aldrich) in 20 ml of dry THF. The reaction mix was stirred at ambient temperature overnight and then refluxed for six hours. The solvents and other volatile materials were removed by rotary evaporation. The residue was dissolved in chloroform and filtered to removed salts. The chloroform was then removed by rotary evaporation and the residue was passed through a flash chromatography column containing flash chromatography silica gel using ethyl acetate as the eluant. One fraction was collected and the product was isolated by removing the ethyl acetate by rotary evaporation. The final product was used as is to prepare fire-retardant electrolyte compositions or fire-retardant gel polymer electrolyte films employed in batteries.

EXAMPLE 4

Synthesis of Tris-(ethoxycarbonyloxyethyl) phosphate (2-Hydroxyethyl)ethylcarbonate ($HOC_2H_4$—O—C(O)—O—$CH_2CH_3$) was prepared as follows. Chloroethylformate (10.8 gm; 0.1 mol) was added to a mixture of ethylene glycol (31 gm; 0.5 mol) and pyridine (7.9 gm; 0.1 mol) in THF (80 ml) dropwise at 0° C. under an inert atmosphere. The mixture thus formed was stirred overnight at ambient temperature. The THF was evaporated off and the residue was dissolved in methylene chloride and washed several times with an aqueous saturated sodium chloride solution to remove ethylene glycol and salt. The organic layer was dried overnight over anhydrous $Na_2SO_4$. The solvent was distilled off, and the pure product was distilled at about 50° C. under reduced pressure.

A solution containing 4.02 gm of (2-hydroxyethyl) ethylcarbonate and 7.7 gm of DMAP was prepared in 25 ml benzene and cooled to 0° C. on an ice bath under an argon atmosphere. Phosphorylchloride (3.06 gm) in 5 ml benzene was added drop-wise to the solution which was then stirred at ambient temperature for 3 hrs and refluxed overnight. The reaction mixture was then filtered, chloroform (100 ml) was added and the mixture was washed with brine (50 ml). The washed, organic phase was dried over anhydrous $Na_2SO_4$ and rotary evaporated to dryness, yielding 7.68 gm of product (a 96.6% yield). ¹H-NMR of the residue indicated that the reaction had gone to completion. TLC chromatography in ethyl acetate showed two spots, one of which corresponded to the product.

The residue was chromatographed on silica gel as described in Example 2. The eluate was dried under a vacuum to yield 3.9 gm (57% yield) of tris-(ethoxycarbonyloxyethyl)phosphate which was used as is to prepare fire-retardant electrolyte compositions or fire-retardant gel polymer electrolyte films employed in batteries.

EXAMPLE 5

Synthesis of 4-Dimethylethoxysilyl-1,2-butylene carbonate

A solution prepared from dimethylethoxysilane (3 gm) (Aldrich), 1-ethenyl-ethylene carbonate (2.28 gm) (Aldrich)

and 200 mg Pt/C in 15 ml THF was refluxed for 18 hours under argon and cooled. Completion of the reaction was confirmed by $^1$H-NMR. After filtering the reaction mixture, the solvent was removed by rotary evaporation and the residual liquid was vacuum distilled. Fractions were collected during the distillation process (1: 35° C., 2 drops; 2: 90° C.–100° C., 0.8 ml; 3: 125° C., 3 ml). The product (2.7 gm) was recovered in the third fraction and used as is to prepare fire-retardant electrolyte compositions or fire-retardant gel polymer electrolyte films employed in batteries.

EXAMPLE 6

Preparation of a Lithium Battery Containing Triethylphosphate

This example describes the preparation of a battery comprising a lithium metal anode, a $LiMn_2O_4$ cathode and a fire-retardant electrolyte.

The fire-retardant electrolyte was prepared to have the following composition: $LiPF_6$ (1.0M) (Aldrich) in triethylphosphate ("TEP") (Aldrich) containing 10% (v/v) dimethylpyrocarbonate (Aldrich) as a $CO_2$ generator. The electrolyte solution was embedded in a 1 mil thick separator (Celgard® 2500). The composite cathode was prepared from 85 parts of $LiMn_2O_4$, 5 parts of acetylene black and 10 parts PVdF dispersed in propylene carbonate:ethylene carbonate (1:1 v/v). The composite cathode paste formed upon heating to 170° C. was then applied on an aluminum current collector and hot pressed (approximately 10,000 lbs of pressure for 1 min at 120° C.–130° C. to form a film. After drying, the cathode was back-filled with the liquid electrolyte. The anode, the separator and the cathode were layered to form a battery having a total thickness of about 15 mil.

Figure 1:
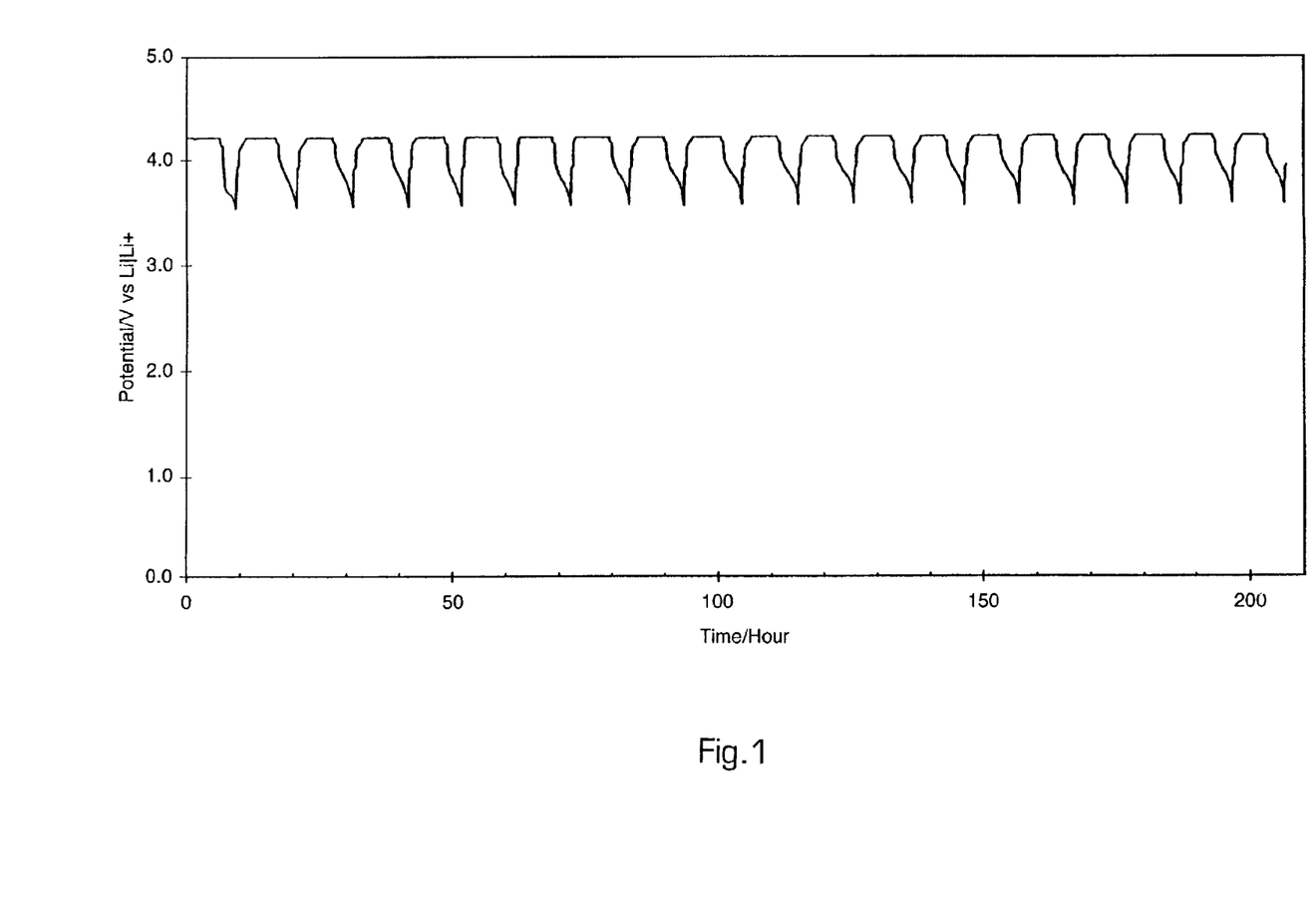
FIG. 1 shows the potential profile for the battery described in Example 6 upon cycling.

FIG. 1 shows the potential profile for the battery and each individual electrode upon cycling.

EXAMPLE 7

Full Cell Testing

A. Primary Batteries. Li|$FeS_2$ and Li|$MnO_2$ primary cells with lithium reference electrodes were built to evaluate the performance of nonflammable electrolytes. The cell body was made of polypropylene. The solvents tested include triethylphosphate ("TEP"), TEP dimer, methoxyethyl diethyl phosphate ("MTEP") and mixtures thereof as indicated in Table 1.

In addition, the effect of added di-tert-butyl dicarbonate ("DTBD") (Aldrich) was also investigated. 1M $LiPF_6$ was the salt used in these tests. The measurements were conducted at different discharge current densities and temperatures.

The results from selected typical systems are shown in Table 1. For the Li|$FeS_2$ system, the discharge current densities applied range from 0.24 to 2.0 mA cm$^{-2}$. Satisfactory results were obtained at current density of 1.0 mA cm$^{-2}$ and lower. The cell voltages for most of the Li|$FeS_2$ cells tested were quite stable and close to 1.5 V during the entire discharging process until the theoretical capacity of the Li anode was reached, as indicated by a rapidly increasing anode potential. At 40° C., the cell shows better performance, presumably due to higher conductivity and lower viscosity of the electrolyte. Similar results were obtained for the Li|$MnO_2$ system.

TABLE 1

SUMMARY OF Li|$FeS_2$ AND Li|$MnO_2$ PRIMARY CELL TESTS

| Cell Type | Electrolyte | Discharge Current Density (mA/cm$^2$) | Cathode Capacity (mAh) | Anode Capacity (mAh) | Time (hr) EODV = 1.0 V | Actual Capacity (mAh) | Energy Capacity (mWh) | Temp (°C.) |
|---|---|---|---|---|---|---|---|---|
| Li|$FeS_2$ | 1M $LiPF_6$ in TEP | 0.24 | ~10 | 11.8 | 79.3 | 9.6 | 12.6 | 23 |
| Li|$FeS_2$ | 1M $LiPF_6$ in TEP | 0.50 | ~9 | 11.8 | 35.5 | 8.9 | 11.4 | 23 |
| Li|$FeS_2$ | 1M $LiPF_6$ in TEP | 1.50 | ~9 | 11.8 | 8.9 | 6.7 | 7.6 | 23 |
| Li|$FeS_2$ | 1M $LiPF_6$ in TEP | 2.00 | ~9 | 11.8 | 2.9 | 2.9 | 3.0 | 23 |
| Li|$FeS_2$ | 1M $LiPF_6$ in TEP + DTBD (5%) | 0.50 | ~9 | 11.8 | 35.9 | 9.0 | 12.8 | 23 |
| Li|$FeS_2$ | 0.5M $LiPF_6$ in TEP dimer | 0.24 | ~10 | 11.8 | 100 | 12.0 | 16.8 | 23 |
| Li|$FeS_2$ | 1M $LiPF_6$ in MTEP | 0.50 | ~10 | 11.8 | 42.0 | 10.5 | 13.5 | 23 |
| Li|$FeS_2$ | 1M $LiPF_6$ in TEP (47.5%) + MTEP (47.5%) + DTBD (5%) | 0.50 | ~12 | 11.8 | 37.2 | 9.3 | 11.9 | 23 |
| Li|$FeS_2$ | 1M $LiPF_6$ in TEP (47.5%) + MTEP (47.5%) + DTBD (5%) | 0.60 | ~12 | 11.8 | 24.2 | 7.3 | 8.0 | 23 |
| Li|$FeS_2$ | 1M $LiPF_6$ in TEP (47.5%) + MTEP (47.5%) + DTBD (5%) | 0.60 | ~12 | 11.8 | 30.8 | 9.2 | 12.2 | 40 |
| Li|$FeS_2$ | 1M $LiPF_6$ in TEP (47.5%) + MTEP (47.5%) + DTBD (5%) | 1.0 | ~12 | 11.8 | 7.3 | 3.6 | 3.3 | 23 |
| Li|$FeS_2$ | 1M $LiPF_6$ in TEP (47.5%) + MTEP (47.5%) + DTBD (5%) | 1.0 | ~12 | 11.8 | 11.8 | 5.9 | 6.4 | 40 |
| Li|$MnO_2$ | 1M $LiPF_6$ in TEP | 0.24 | ~6 | 11.8 | 47.8 | 5.8 | 15.3 | 23 |
| Li|$MnO_2$ | 1M $LiPF_6$ in TEP | 0.50 | ~6 | 11.8 | 25.1 | 6.3 | 15.2 | 23 |
| Li|$MnO_2$ | 1M $LiPF_6$ in TEP (47.5%) + MTEP (47.5%) + DTBD (5%) | 0.50 | ~6 | 11.8 | 17.6 | 4.4 | 10.8 | 23 |
| Li|$MnO_2$ | 1M $LiPF_6$ in TEP (47.5%) + MTEP (47.5%) + DTBD (5%) | 0.50 | ~6 | 11.8 | 20.5 | 5.1 | 14.1 | 40 |
| Li|$MnO_2$ | 1M $LiPF_6$ in TEP (47.5%) + MTEP (47.5%) + DTBD (5%) | 1.0 | ~6 | 11.8 | 8.3 | 4.1 | 11.0 | 40 |

B. Cyclability Tests (Li|Li Cells). The feasibility of using the fire-retardant electrolytes in a lithium metal rechargeable battery was evaluated by studying the cyclability of lithium between two lithium electrodes. The DC cycling tests of Li|Li cells with lithium reference electrodes were conducted in TEP, TEP dimer, MTEP, tri(methoxyethyl)phosphate ("TMEP"), and mixtures thereof with salts including $LiPF_6$, $LiN(CF_3SO_2)_2$, $LiCF_3SO_3$, and $LiAsF_6$. A current density of 3 mA cm$^{-2}$ and half-cycle time of 30 min. were the conditions used in these experiments. An overpotential of 2.0 V or higher for either Li electrode was considered an indication of failure. The results of these tests are presented in Table 2.

Figure 2:
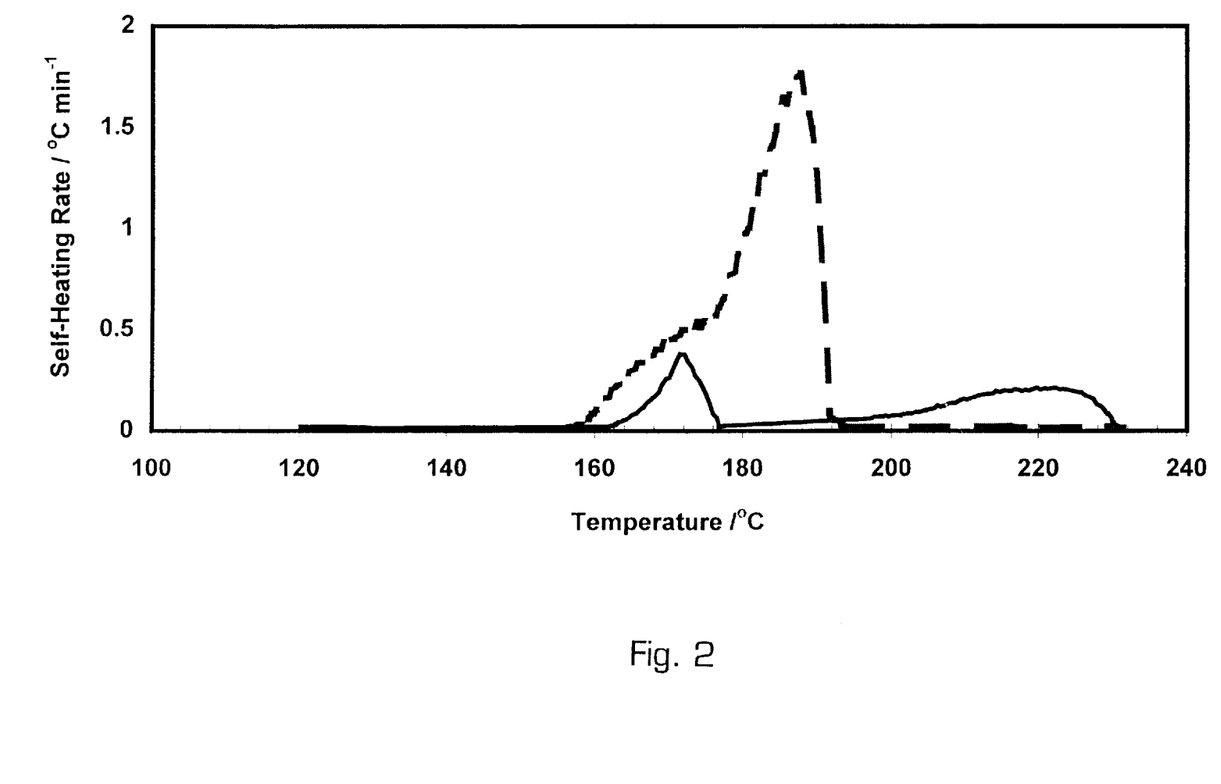
FIG. 2 shows the exothermic behavior for strips of lithium metal immersed in the triethylphosphate (47.5% v/v) :methoxyethyl diethyl phosphate (47.5% v/v):di-tert-butyl dicarbonate (5% v/v) mixture (solid line) and for the electrolyte used in a commercial primary lithium battery (dashed line) as described in Example 8.

The results depicted in FIG. 2 show that both electrolytes exhibit exothermic behavior beginning at about 160° C. The flame-retardant electrolyte system exhibits a maximum self-heating rate of 0.38° C. min$^{-1}$ at 178° C. By contrast, the commercial electrolyte exhibits a larger exotherm with a maximum self-heating rate of 1.76° C. min$^{-1}$ at 191° C. The flame-retardant electrolyte exhibits a second small exotherm between 200° C.–230° C., but the total heat liberated during these two exotherms is less than that liberated during the single exotherm of the commercial battery electrolyte.

TABLE 2

SUMMARY OF DC CYCLING TESTS FOR Li|Li CELLS

| Solvent | Salt and Concentration | Current Density (mA/cm$^2$) | ½ Cycle Time (min) | Number of Cycles | Temp. (°C.) |
| --- | --- | --- | --- | --- | --- |
| TEP | 1M LiPF$_6$ | 1.0 | 20 | 160 | 23 |
| TEP | 1M LiPF$_6$ | 3.0 | 30 | 15 | 23 |
| TEP | 1M LiPF$_6$, 0.1M LiCO$_3$ | 3.0 | 30 | 8 | 23 |
| TEP | 1M LiAs F$_6$ | 3.0 | 30 | 13 | 23 |
| TEP | 1M Li Trillate | 3.0 | 30 | 6 | 23 |
| TEP | 1M Li imide | 5.0 | 30 | 2 | 23 |
| TEP dimer | 0.5M LiPF$_6$ | 1.0 | 20 | 2 | 23 |
| MTEP | 1M LiPF$_6$ | 3.0 | 30 | 15 | 23 |
| TMEP | 0.5M LiPF$_6$ | 1.0 | 20 | 100 | 23 |
| TEP + 5% PC | 1M LiPF$_6$ | 3.0 | 30 | 9 | 23 |
| TEP + 1% DTBD | 1M LiPF$_6$ | 3.0 | 30 | 8 | 23 |
| TEP + 5% DTBD | 1M LiPF$_6$ | 3.0 | 30 | 48 | 23 |
| TEP + 5% DTBD | 1M LiPF$_6$ | 3.0 | 30 | 50 | 40 |
| TEP + 5% DTBD | 1M LiPF$_6$ | 3.0 | 30 | 51 | 60 |
| TEP (66%) + TEP dimer (34%) | 1M LiPF$_6$ | 1.0 | 20 | 52 | 23 |
| TEP (63%) + TEP dimer (32%) + DTBD (5%) | 1M LiPF$_6$ | 1.0 | 20 | 335 | 23 |
| TEP (45%) + TMEP (50%) + DTBD (5%) | 0.75M LiPF$_6$ | 3.0 | 30 | 8 | 23 |
| MTEP + 5% DTBD | 1M LiPF$_6$ | 3.0 | 30 | 19 | 23 |
| TEP(47.5%) + MTEP (47.5%) + DTBD (5%) | 1M LiPF$_6$ | 3.0 | 30 | 14 | 23 |

Under the test conditions, the cell made with the electrolyte composition of 1M LiPF$_6$ in TEP can cycle 15 times. This system is equivalent to one full cycle of total Li electrode capacity. The addition of 5% DTBD improved the cyclability to 48 cycles, or three cycles of the lithium. This improvement may be attributed to the in situ decomposition of the dicarbonate to produce carbon dioxide, thereby passivating the lithium electrode surfaces.

EXAMPLE 8

Materials Safety: Accelerating Rate Calorimetry

In order to assess the potential explosive hazard of the fire-retardant electrolyte compositions, the thermal characteristics of the solvent mixture TEP (47.5% v/v), MTEP (47.5% v/v) and DTBD (5% v/v) were evaluated in an aerobic environment in an accelerating rate calorimeter (ARC) as described above.

FIG. 2 depicts the self-heating rate as a function of temperature for strips of lithium metal immersed in the TEP:MTEP:DTBD mixture and for the electrolyte used in a commercial primary lithium battery. In both cases, the electrolyte contains 1M salt (LiPF$_6$ for the flame-retardant electrolyte and LiCF$_3$SO$_3$ for the commercial battery electrolyte) and a strip of lithium metal (10 mg). The total weight of the solution was about 2.1 gm for both mixtures.

EXAMPLE 9

Preparation of a Lithium Battery Containing TEP and Ethylene Carbonate

A solution of lithium bis(trifluoromethane-sulfonate) imide (LiN(CF$_3$SO$_3$)$_2$) was prepared in a solvent system composed of ethylene carbonate:TEP (1:1). The room temperature conductivity of this solution was found to be 2.82×10$^{-3}$ S cm$^{-1}$ by AC impendance analysis.

A battery comprising a lithium metal anode, a LiMn$_2$O$_4$ cathode and a fire-retardant electrolyte may be made according to the procedure of Example 6 substituting the ethylene carbonate:TEP solvent system for the TEP. It is anticipated that the potential profile for the battery and each individual electrode upon cycling will be similar to that depicted in FIG. 1.

EXAMPLE 10

Preparation of a Lithium Battery Containing

A battery comprising a lithium metal anode, a $LiMn_2O_4$ cathode and a fire-retardant electrolyte may be made according to the procedure of Example 9 substituting prepared as described in Example 1 for the TEP in the ethylene carbonate:TEP solvent system. It is anticipated that the potential profile for the battery and each individual electrode upon cycling will be similar to that depicted in FIG. 1.

EXAMPLE 11

Preparation of a Lithium Battery Containing Tris-(methoxyethoxyethyl)phosphate

A battery comprising a lithium metal anode, a $LiMn_2O_4$ cathode and a fire-retardant electrolyte may be made according to the procedure of Example 9 substituting tris-(methoxyethoxyethyl)phosphate prepared as described in Example 2 for the TEP in the ethylene carbonate:TEP solvent system. It is anticipated that the potential profile for the battery and each individual electrode upon cycling will be similar to that depicted in FIG. 1.

EXAMPLE 12

Preparation of a Lithium Battery Containing Tris-(2-Methoxyethoxy)trifluorophosphazene A battery comprising a lithium metal anode, a $LiMn_2O_4$ cathode and a fire-retardant electrolyte may be made according to the procedure of Example 9 substituting tris-(2-methoxyethoxy)trifluorophosphazene prepared as described in Example 3 for the TEP in the ethylene carbonate:TEP solvent system. It is anticipated that the potential profile for the battery and each individual electrode upon cycling will be similar to that depicted in FIG. 1.

EXAMPLE 13

Preparation of a Lithium Battery Containing Tris-(ethoxycarbonyloxyethyl)phosphate A battery comprising a lithium metal anode, a $LiMn_2O_4$ cathode and a fire-retardant electrolyte may be made according to the procedure of Example 9 substituting tris-(ethoxycarbonyloxyethyl)phosphate prepared as described in Example 4 for the TEP in the ethylene carbonate:TEP solvent system. It is anticipated that the potential profile for the battery and each individual electrode upon cycling will be similar to that depicted in FIG. 1.

EXAMPLE 14

Preparation of a Lithium Battery Containing 1,1-Dimethyl-(1-ethylethylene carbonate)-ethoxysilane A battery comprising a lithium metal anode, a $LiMn_2O_4$ cathode and a fire-retardant electrolyte may be made according to the procedure of Example 9 substituting 1,1-dimethyl-(1-ethylethylene carbonate)-ethoxysilane prepared as described in Example 5 for the TEP in the ethylene carbonate:TEP solvent system. It is anticipated that the potential profile for the battery and each individual electrode upon cycling will be similar to that depicted in FIG. 1.

EXAMPLE 15

Preparation of a Lithium Battery Containing Perfluoropropylene Carbonate

A battery comprising a lithium metal anode, a $LiMn_2O_4$ cathode and a fire-retardant electrolyte may be made according to the procedure of Example 9 substituting perfluoropropylene carbonate that can be prepared from propylene carbonate using the method described in European Patent Publication No. 0557167 for the TEP in the ethylene carbonate:TEP solvent system. It is anticipated that the potential profile for the battery and each individual electrode upon cycling will be similar to that depicted in FIG. 1.

EXAMPLE 16

Preparation of a Lithium Battery Containing a Perfluoropolyether

A battery comprising a lithium metal anode, a $LiMn_2O_4$ cathode and a fire-retardant electrolyte may be made according to the procedure of Example 9 substituting perfluoropolyether Galden® HT90 (formula weight=460) (Harris Speciality Chemicals, PCR Division) for the TEP in the ethylene carbonate:TEP solvent system. It is anticipated that the potential profile for the battery and each individual electrode upon cycling will be similar to that depicted in FIG. 1.

EXAMPLE 17

Preparation of a Lithium Battery Having a Carbon Anode and Containing a Nonflammable Electrolyte This example describes the preparation of a battery comprising a carbon anode, a $LiMn_2O_4$ cathode and a fire-retardant electrolyte.

An electrolyte solution of 1.0M $LiPF_6$ in ethylene carbonate:TEP (1:4 v/v) is embedded in a 1 mil thick separator (Celgard® 2500). The carbon anode is prepared from a composite of 90 parts coke carbon (Ucar Carbon) and 10 parts PVdF in propylene carbonate:ethylene carbonate (1:1 v/v). The composite is compounded at about 170° C. for about 5 min and then hot pressed (10,000 psi, 120° C.–130° C. for 1 min) onto a copper current collector. After drying, the anode is back-filled with the electrolyte solution. The cathode is prepared from 82 parts $LiMn_2O_4$, 12 parts acetylene black and 6 parts PVdF dispersed in propylene carbonate:ethylene carbonate (1:1 v/v). The cathode mixture is compounded at 170° C. for about 5 min and then applied onto an aluminum current collector by hot pressing as above. After drying, the cathode is back-filled with the liquid electrolyte. The anode, the separator and the cathode are layered to form a battery having a total thickness of about 15 mil.

EXAMPLE 18

Fabrication of a Fire-Retardant Electrolyte Film Containing TEP

In a dry box, $LiPF_6$ (1 gm), PVdF (2 gm) and TEP (6 gm) were mixed and heated to 120° C. until a clear melt was obtained. The hot melt was poured into a mold and pressed. After cooling to ambient temperature, a free-standing film was formed. The conductivity of the film was determined by AC impedance. The ambient temperature conductivity was found to be $1.76 \times 10^{-3}$ S cm$^{-1}$.

EXAMPLE 19

Preparation of a Fire-Retardant Electrolyte Film Containing TEP and Ethylene Carbonate

A conductive film comprising LiPF$_6$, PVdF and a fire-retardant electrolyte may be made according to the procedure of Example 18 substituting a solvent system composed of ethylene carbonate:TEP (1:1) for the TEP. It is anticipated that the AC impedance for the film will be similar to that measured in Example 18.

EXAMPLE 20

Fabrication of a Fire-Retardant Electrolyte Film Containing

A conductive film comprising LiPF$_6$, PVdF and a fire-retardant electrolyte may be made according to the procedure of Example 19 substituting prepared as described in Example 1 for the TEP in the ethylene carbonate:TEP solvent system for the TEP. It is anticipated that the AC impedance for the film will be similar to that measured in Example 19.

EXAMPLE 21

Fabrication of a Fire-Retardant Electrolyte Film Containing Tris-(methoxyethoxyethyl)phosphate A conductive film comprising LiPF$_6$, PVdF and a fire-retardant electrolyte may be made according to the procedure of Example 19 substituting tris-(methoxyethoxyethyl) phosphate prepared as described in Example 2 for the TEP in the ethylene carbonate:TEP solvent system for the TEP. It is anticipated that the AC impedance for the film will be similar to that measured in Example 19.

EXAMPLE 22

Fabrication of a Fire-Retardant Electrolyte Film Containing 2-Methoxyethoxytrifluorophosphazene A conductive film comprising LiPF$_6$, PVdF and a fire-retardant electrolyte may be made according to the procedure of Example 19 substituting 2-methoxyethoxytrifluorophosphazene prepared as described in Example 3 for the TEP in the ethylene carbonate:TEP solvent system for the TEP. It is anticipated that the AC impedance for the film will be similar to that measured in Example 19.

EXAMPLE 23

Fabrication of a Fire-Retardant Electrolyte Film Containing Tris-(ethoxycarbonyloxyethyl)phosphate A conductive film comprising LiPF$_6$, PVdF and a fire-retardant electrolyte may be made according to the procedure of Example 19 substituting tris-(ethoxycarbonyloxyethyl)phosphate prepared as described in Example 4 for the TEP in the ethylene carbonate:TEP solvent system for the TEP. It is anticipated that the AC impedance for the film will be similar to that measured in Example 19.

EXAMPLE 24

Fabrication of a Fire-Retardant Electrolyte Film Containing 1,1-Dimethyl-(1-ethylethylene carbonate)-ethoxysilane A conductive film comprising LiPF$_6$, PVdF and a fire-retardant electrolyte may be made according to the procedure of Example 19 substituting 1,1-dimethyl-(1-ethylethylene carbonate)-ethoxysilane prepared as described in Example 5 for the TEP in the ethylene carbonate:TEP solvent system for the TEP. It is anticipated that the AC impedance for the film will be similar to that measured in Example 19.

EXAMPLE 25

Fabrication of a Fire-Retardant Electrolyte Film Containing Perfluoropropylene Carbonate A conductive film comprising LiPF$_6$, PVdF and a fire-retardant electrolyte may be made according to the procedure of Example 19 substituting perfluoropropylene carbonate that can be prepared from propylene carbonate using the method described in European Patent Publication No. 0557167 for the TEP in the ethylene carbonate:TEP solvent system. It is anticipated that the AC impedance for the film will be similar to that measured in Example 19.

EXAMPLE 26

Fabrication of a Fire-Retardant Electrolyte Film Containing Perfluoropolyether A conductive film comprising LiPF$_6$, PVdF and a fire-retardant electrolyte may be made according to the procedure of Example 19 substituting perfluoropolyether Galden® HT90 (formula weight=460) (Harris Speciality Chemicals, PCR Division) for the TEP in the ethylene carbonate:TEP solvent system. It is anticipated that the AC impedance for the film will be similar to that measured in Example 17.

EXAMPLE 27

Fabrication of a Fire-Retardant Electrolyte Film Containing a Polymethyl Siloxane with C$_3$H$_6$OC$_2$F$_4$SO$_3$Li Pendant Groups Lithium triflate polysiloxane (polymethyl siloxane with C$_3$H$_6$OC$_2$F$_4$SO$_3$Li pendant groups) was synthesized as according to the following scheme and procedures:

(a.) Preparation of Fluorosultone (2)

In a 500-ml Parr pressure reactor equipped with a magnetic stirrer, 50 ml of fresh sulfur trioxide was prepared by distillation of fuming sulfuric acid. Under stirring, tetrafluoroethylene was introduced continuously at the pressure of 30 psi. Exothermic reaction took place. The volume of the liquid content increased gradually as the reaction proceeded. At the end of the reaction, the crude product was purified by distillation. A colorless liquid product was collected at the temperature of 42°–43° C. 162.9 g fluorosultone (2) was obtained.

(b.) Preparation of (3)

In a 250-ml 3-neck flask equipped with a magnetic stirrer and covered with aluminum foil, 63.44 g (0.50 mol) of silver fluoride and 100 ml of anhydrous diglyme were combined. The flask was cooled to −78° C. and 90.04 g (0.50 mol) of fluorosultone (2) was added dropwise. A clear solution was produced after 1 hr at room temperature. The flask was again cooled to −78° C. and 60.49 g (0.50 mol) of allyl bromide (1) was added dropwise. The reaction was heated at 45°–50° C. for 16 hours. The mixture was then filtered to remove AgBr. The filtrate was poured into 100 ml water and the oily layer which formed was washed three times with water and dried over $MgSO_4$. Distillation gave 79.16 g (3), 76.1%, bp 120°–121° C. The identity of the product was confirmed using $^1H$ NMR spectroscopy ($^1H$ NMR (CDCl/δ): 4.60 (d, 2H, $CH_2$=CH$CH_2$O—); 5.34–5.47 (m, 2H, $CH_2$=CH—); 5.89–5.98 (m, 1H, $CH_2$=CH$CH_2$O—)).

(c.) Preparation of (5)

In a high pressure reactor, 72.69 g (0.35 mol) of (3), 80.53 g (0.70 mol) dichloromethylsilane (4) and 0.46 g (1.1 mol) catalyst chloroplatinic acid were combined. The reactor was sealed and filled with argon to a pressure of 50 psi and then heated at 70°–90° C. for 22 hrs. After cooling to room temperature, the product was then transferred under inert atmosphere to a flask using a double-tip needle. Un-reacted dichloromethylsilane was removed under reduced pressure. Distillation gave 85.89 g (5), 76%, bp 68°–71° C./0.80 mm Hg. The identity of the product was confirmed using $^1H$ NMR spectroscopy ($^1H$ NMR (CDCl$_3$/δ): 0.82 (s, 3H, $CH_3$Si—); 1.15–1.25 (m, 2H, Si$CH_2$CH$_2$CH$_2$—); 1.9–2.0 (m, 2H, SiCH$_2$$CH_2$CH$_2$—); 4.1–4.2 (t, 2H, SiCH$_2$CH$_2$$CH_2$OC$_2$F$_4$SO$_2$F)).

(d.) Preparation of (6)

(5) (85.8 g, 0.27 mol) was taken up in anhydrous ether (50 mL), and the resultant solution was then added to a mixture of water (50 mL) and ether (50 mL) dropwise under stirring. At the end of the addition, the reaction was allowed to continue overnight. The oily layer was separated from the aqueous layer. The aqueous layer was then extracted with ether (40 mL×3), and the ether extract was combined with the oily layer product, washed with water until the water phase became neutral to pH paper, dried over anhydrous $MgSo_4$, filtered, and the solvent was removed from the filtrate by rotary evaporator. The resulting colorless liquid residue was further dried at room temperature under 0.1 torr vacuum for 4 hours to yield 70.68 g. cyclosiloxane (6) (99%). The identity of the intermediate (6) was confirmed using $^1H$ NMR spectroscopy ($^1H$ NMR (CDCl$_3$/δ): 0.05–0.08 (m, 3H, $CH_3$Si—); 0.25–0.35 (m, 2H, Si$CH_2$CH$_2$CH$_2$—); 1.85–1.90 (broad, 2H, SiCH$_2$$CH_2$O—); 4.0–4.5 (broad, 2H, SiCH$_2$CH$_2$$CH_2$O)).

(e.) Preparation of (7)

The cyclosiloxane (6) (350 g, 1.305 mol)1 and hexamethyldisiloxane (42.4 g, 0.261 mol) were added to a round bottom flask with 10 drops of concentrated sulfuric acid and allowed to sit overnight. An additional 10 drops of concentrated sulfuric acid were then added and the mixture was stirred for 24 hours. The mixture was then taken in methylene chloride and washed with water (2×500 mL) and then a saturated solution of NaCl containing a small amount of NaHCO$_3$. The solution was dried over MgSO$_4$ before removing the solvent by evaporation.

(f.) Preparation of (8)

The sulfonyl fluoride polysiloxane (7) (59.80 g, 0.22 mol) was taken up in 270 mL THF. To the THF solution, lithium hydroxide aqueous solution (10.67 g of anhydrous LiOH, 0.44 mol, in 150 mL water) was added dropwise in 6 hours. Theoretically, two moles of lithium hydroxide are required to convert each sulfonyl fluoride group to lithium sulfonate. However, lithium hydroxide readily absorbs moisture because it is hygroscopic. A slight excess of LiOH was added until the solution became neutral using a pH meter as a monitor. The absence of $^{19}F$ NMR absorption at 123.5 ppm due to —SO$_2$F confirmed that all of the sulfonyl fluoride groups were converted to lithium sulfonate. THF and water were then rotary evaporated off. The residual white solid was dried at 50° C. under 0.1 torr vacuum overnight.

The resulting crude product was dissolved in 200 mL acetone. The mixture was filtered in order to remove LiF, and the filtrate was then concentrated. The concentrated acetone solution was added dropwise to 600 mL of dry ether under stirring. The polymer product was precipitated out. The polymer product (8) was then dried at 70°–80° C. under 0.05 torr vacuum for 2 days, and the pure product (8) was obtained in 93% yield. The identity of the product (8) was confirmed using $^1H$ NMR spectroscopy ($^1H$ NMR (D$_2$O/δ): 0.21 (broad, 3H, CH$_3$Si—); 0.70 (broad, 2H, Si$CH_2$CH$_2$CH$_2$—); 1.80 (broad, 2H, SiCH$_2$$CH_2$CH$_2$—); 4.10 (broad, 2H, SiCH$_2$CH$_2$$CH_2$OC$_2$F$_4$SO$_3$Li); $^{19}F$ NMR (D$_2$O/ppm): −5.61 (s, —$CF_2$CF$_2$SO$_3$Li); −39.03 (s, —CF$_2$$CF_2$SO$_3$Li)).

(g.) Preparation of the fire-retardant film

Lithium triflate polysiloxane (1 gm), PVdF (2 gm) and a mixture of 1 part propylene carbonate, 1 part ethylene carbonate and 2 parts triethylphosphate (6 gm) were mixed and heated to 120° C. until a clear melt was obtained. The melt was hot-pressed, then cooled to ambient temperature to yield a clear, free-standing film. The conductivity of this film was measured by AC impedance. The ambient temperature conductivity was found to be $7.85 \times 10^{-4}$ S cm$^{-1}$.

EXAMPLE 28

Fabrication of a Fire-Retardant Electrolyte Film Containing a Polymethyl Siloxane with $C_3H_6OC_2F_4SO_2N(Li)C(O)CF_3$ Pendant Groups A lithium triflate polysiloxane single-ion conducting polymer having the general structure was synthesized according to the following scheme and procedures.

(a.) Preparation of (9)

The cyclosiloxane (6) prepared according to the procedure described in Example 27 (35.5 gm, 117 mmol) was dissolved in THF (40 mL) and added at −78° C. under stirring to a mixture of ammonia (17.2 gm, 0.9 mol) in THF (220 mL). The mixture was stirred at −78° C. for about one-half hour, then warmed to 0° C. over about two hours. Stirring was continued at 0° C. for about one hour. The mixture was allowed to warm to ambient temperature and then stirred overnight. The mixture was concentrated in vacuo and taken up in methanol (150 mL). Lithium hydroxide (9.9 gm, 236 mmol in 75 mL water) was added. The mixture was concentrated, then methanol (150 mL) was added, followed by 10 mL (120 mmol) of 12N hydrochloric acid in 20 mL methanol. The product was purified by flash chromatography on silica gel (methylene choride:ethyl acetate 1:1).

(b.) Preparation of (10)

Sodium hydride (14.5 gm, 363 mmol, 60% in oil), washed with 3×60 ml of pentane, was added in eight portions to a mixture of (9) (38.5 gm, 129,6 mmol) in 550 mL of dimethoxyethane. The mixture was warmed to 50° C. and stirring was continued for over 2.5 hours. The suspension thus formed was cooled to −70° C. and trifluoroacetic anhydride (29.3 mL, 207.5 mmol) was added over 30 minutes. The slurry thus formed was stirred with a mechanical stirrer at about −25° C. for 2.5 hours until all of the solid had dissolved. The mixture was allowed to warm to room temperature and stirred overnight. The crude product mixture was concentrated in vacuo and the residue was taken up in 80 mL of $CH_2Cl_2$:ethyl acetate (5:1) and purified by flash column chromatography on silica gel ($CH_2Cl_2$:ethyl acetate 1:1) to yield the pure sodium salt corresponding to (10). The latter was converted to the lithium salt (10) by treatment on the ion exchange resin IR120(+) previously treated with water, then an aqueous solution of LiOH. The product yield was greater than 80%.

(c.) Preparation of the fire-retardant film

A conductive film can be made according to the procedure of Example 27 substituting (10) for (8). It is anticipated that the AC impedance for the film will be similar to that measured in Example 27.

We claim:

1. A battery comprising an electrolyte having conductivity greater than $10^{-3}$ S cm$^{-1}$ at ambient temperature, and which includes a compound which generates $CO_2$ as a fire-retardant gas, upon decomposition.

2. The battery of claim 1 wherein the fire-retardant gas producing electrolyte comprises a dicarbonate, ester, perester, dioxalate, acyl peroxide, peroxodicarbonates, or Diels-Alder adducts of carbon dioxide, or mixtures thereof.

3. The battery of claim 1 wherein the fire-retardant gas producing electrolyte comprises di-tert-butyl dicarbonate.

4. The battery of claim 1 further characterized by at least one of the following:
   (A) the electrolyte includes a silane;
   (B) the electrolyte includes a phosphate;
   (C) the electrolyte includes a halogenated carbonate;
   (D) the electrolyte includes a cyclophosphazene;
   (E) the electrolyte includes a phospholane;
   (F) the electrolyte includes a fluorinated polyether.

5. The battery of claim 4 wherein the fire-retardant gas producing electrolyte comprises a dicarbonate, ester, perester, dioxalate, acyl peroxide, peroxodicarbonates, or Diels-Alder adducts of carbon dioxide, or mixtures thereof.

6. The battery of claim 4 wherein the fire-retardant gas producing electrolyte comprises di-tert-butyl dicarbonate.

7. The battery of claim 4 wherein the silane comprises:

wherein $R^{10}$, $R^{11}$, $R^{12}$ and $R^{13}$ are independently selected from the group consisting of (a) $C_1$–$C_6$ alkyl terminally substituted with 0 to 3 halogen atoms and containing 0 to 3 ether linkages and (b) —$OR^{14}$ wherein $R^{14}$ is $C_1$–$C_6$ alkyl terminally substituted with 0 to 3 halogen atoms and containing 0 to 3 ether linkages, and optionally wherein two or more compounds of structure (IV) are linked together by a siloxane linkage.

8. The battery of claim 14 wherein the phosphate having the following structure: I wherein $R^1$, $R^2$ and $R^3$ are independently selected from the group consisting of (a) $C_1$–$C_6$ alkyl terminally substituted with 0 to 3 halogen atoms and containing 0 to 3 ether linkages, (b) $Si(R^4)_3$ and (c) $B(OR^4)_2$ wherein the $R^4$s are independently $C_1$–$C_6$ alkyl containing 0 to 3 ether linkages or $C_1$–$C_3$ alkoxy, and optionally wherein two or more compounds of structure (I) are linked together by an ether linkage.

9. The battery of claim 4 wherein the halogenated carbonate has the following structure:

wherein $R^{15}$ and $R^{16}$ are independently selected from the group consisting of (a) perfluorinated or partially fluorinated $C_1$–$C_{10}$ alkyl containing 0 to 3 ether linkages and (b) —$OR^{17}$ wherein $R^{17}$ is perfluorinated or partially fluorinated $C_1$–$C_{10}$ alkyl containing 0 to 3 ether linkages or wherein $R^{15}$ and $R^{16}$ are linked together to form a perfluorinated or partially fluorinated $C_1$–$C_{10}$ alkyl bridge, and wherein the halogenated carbonate may have multiple carbonate groups.

10. The battery of claim 4 wherein the cyclophosphazene has the following structure:

wherein n is an integer from 3 to 6 and $R^7$ and $R^8$ are independently selected from the group consisting of hydrogen, halogen and —$OR^9$ wherein $R^9$ is $C_1$–$C_6$ alkyl terminally substituted with 0 to 3 halogen atoms and containing 0 to 3 ether linkages, with the proviso that when one of $R^7$ or $R^8$ is —$OR^9$, the other is halogen.

11. The battery of claim 4 wherein the phospholane has the following structure:

wherein $R^5$ is selected from the group consisting of oxy or a pair of electrons and, when $R^5$ is a pair of electrons, $R^6$ is $C_1$–$C_6$ alkyl terminally substituted with 0 to 3 halogen atoms and containing 0 to 3 ether linkages.

12. The battery of claim 4 wherein the fluorinated polyether has the following structure:

wherein $R^{18}$ and $R^{19}$ are independently perfluorinated or partially fluorinated $C_1$–$C_{10}$ alkyl, $R^{20}$ and $R^{21}$ are independently selected from the group consisting of —F and perfluorinated or partially fluorinated $C_1$–$C_{10}$ alkyl, and x and y are independently selected with values ranging from 5 to 150.

13. The battery of claim 4 wherein the fluorinated polyether has an average molecular weight between about 400 and 10,000.

* * * * *